June 16, 1959 B. H. ROSS 2,890,462

MEANS FOR MOUNTING AN APPLIANCE IN A COUNTER OPENING

Filed Oct. 8, 1957 5 Sheets-Sheet 1

INVENTOR.
BUDD H. ROSS

BY
Cook and Schermerhorn
ATTORNEYS

MEANS FOR MOUNTING AN APPLIANCE IN A COUNTER OPENING

Filed Oct. 8, 1957 5 Sheets-Sheet 2

INVENTOR.
BUDD H. ROSS
BY
Cook and Schermerhorn
ATTORNEYS

MEANS FOR MOUNTING AN APPLIANCE IN A COUNTER OPENING

Filed Oct. 8, 1957 5 Sheets-Sheet 3

INVENTOR.
BUDD H. ROSS
BY
Cook and Schermerhorn
ATTORNEYS

INVENTOR.
BUDD H. ROSS
BY
Cook and Schermerhorn
ATTORNEYS

June 16, 1959 B. H. ROSS 2,890,462

MEANS FOR MOUNTING AN APPLIANCE IN A COUNTER OPENING

Filed Oct. 8, 1957 5 Sheets-Sheet 5

INVENTOR.
BUDD H. ROSS

BY

Cook and Schermerhorn

ATTORNEYS 2,890,462

MEANS FOR MOUNTING AN APPLIANCE IN A COUNTER OPENING

Budd H. Ross, Portland, Oreg.

Application October 8, 1957, Serial No. 688,981

22 Claims. (Cl. 4—187)

This invention relates to improvements in support and clamp means for mounting an appliance, such as a sink, burner plate, washer unit and the like in a drainboard or counter opening.

This application is a continuation-in-part of my three co-pending applications, as follows: Serial No. 301,142, filed July 26, 1952; Serial No. 356,508, filed May 21, 1953; and Serial No. 414,634, filed March 8, 1954, all now abandoned.

Various types of trim frames have heretofore been devised to support and clamp a sink rim within a drainboard opening so that the rim flange would not overlie the drainboard and constitute a dam as well as a leakage point for water on the drainboard. The mounting frames proposed for such purpose, however, have left much to be desired in regard to cost of manufacture, ease of installation and the sealing function. They have been expensive to make and have involved complicated accessory clamping devices which are difficult and laborious to install and remove. Also, existing mounting frames for sinks are not generally adaptable for the mounting of other devices in a counter opening, as mentioned above.

The general object of the present invention, therefore, is to provide improved and inexpensive support and clamp means for such appliances which are easy and quick to install and which are capable of more general application to a greater variety of installation needs.

Another object is to provide a self-contained supporting or clamping device which is effective without the use of bolts, nuts, screws or other accessory parts.

Another object is to provide a mounting frame having integral supporting or clamping parts which may be adjusted with facility.

Another object is to provide a counter clamp device which makes an appliance readily removable from the counter.

Another object is to provide a mounting frame which may be attached first to either the supported or the supporting member at the option of the installer.

Another object is to provide clamping means for the purpose described engageable with a supporting or supported member by a powerful wedging action at closely spaced points to effect sealing contact between two such members.

Another object is to provide a mounting frame having an improved temporary support for an appliance, such as a sink, in a counter opening during installation.

Another object is to provide improved counter clamp means which may be attached to, or form an integral part of, an appliance to be mounted in a counter opening.

Another object is to provide an improved method and apparatus for forming the novel support or clamp means in an appliance mounting frame.

According to the present invention, bendable strips of flat sheet material are arranged to present their edge surfaces adjacent a bending point in engagement with a supporting or supported member whereby a relatively thin section of the material will develop exceptional strength and rigidity in edgewise loading. Such loading may constitute merely a supporting function where no clamping action is desired, as in the case of a temporary support for a sink or other appliance in a counter opening preparatory to clamping the appliance securely in place. The strip of material thus stressed in edgewise loading may be merely bent or stretched laterally from the plane of a web with which the strip is integrally united at both ends, or the strip may have a free end forming a tongue which is bent laterally out of the plane of the web element.

By forming the supporting edge of such a strip or tongue at an oblique angle to a surface which is to be engaged thereby, a camming or wedging action is obtained upon bending of the strip or tongue to form a secure clamp against a suitable flange or abutment confronting the engaging edge. By winding the free end of such a tongue on a slotted key shank, a very powerful clamping action may be exerted.

In the case of a mounting frame for an appliance, the bendable strips or tongues are advantageously formed, either as an integral or attached part of a web element having a perpendicular flange along one edge thereof. When clamping action is employed as above described, the flange or flanges thereby form a confronting abutment which serves as a reaction member for the clamp. In a similar manner, the web element containing or carrying the bendable strips or tongues may constitute an integral part of the supported or supporting member itself, thereby obviating the need for a mounting frame as a separate article of manufacture.

Mounting frames embodying the invention are advantageously formed from aluminum extrusions or stainless steel strip but the invention is not to be limited to these specific materials.

Thus, the invention may take various forms and certain features may be employed without others according to the requirements of each particular application, all such modifications within the scope of the appended claims being included in the invention. Certain preferred embodiments are shown in the accompanying drawings, but these are to be taken as illustrative and not as limiting the invention, as still other mechanical equivalents will occur to persons skilled in the art.

Figures 1, 2, 3, 4, 5, 6, 7, 8, 9, 10, 11, 11A, 12:
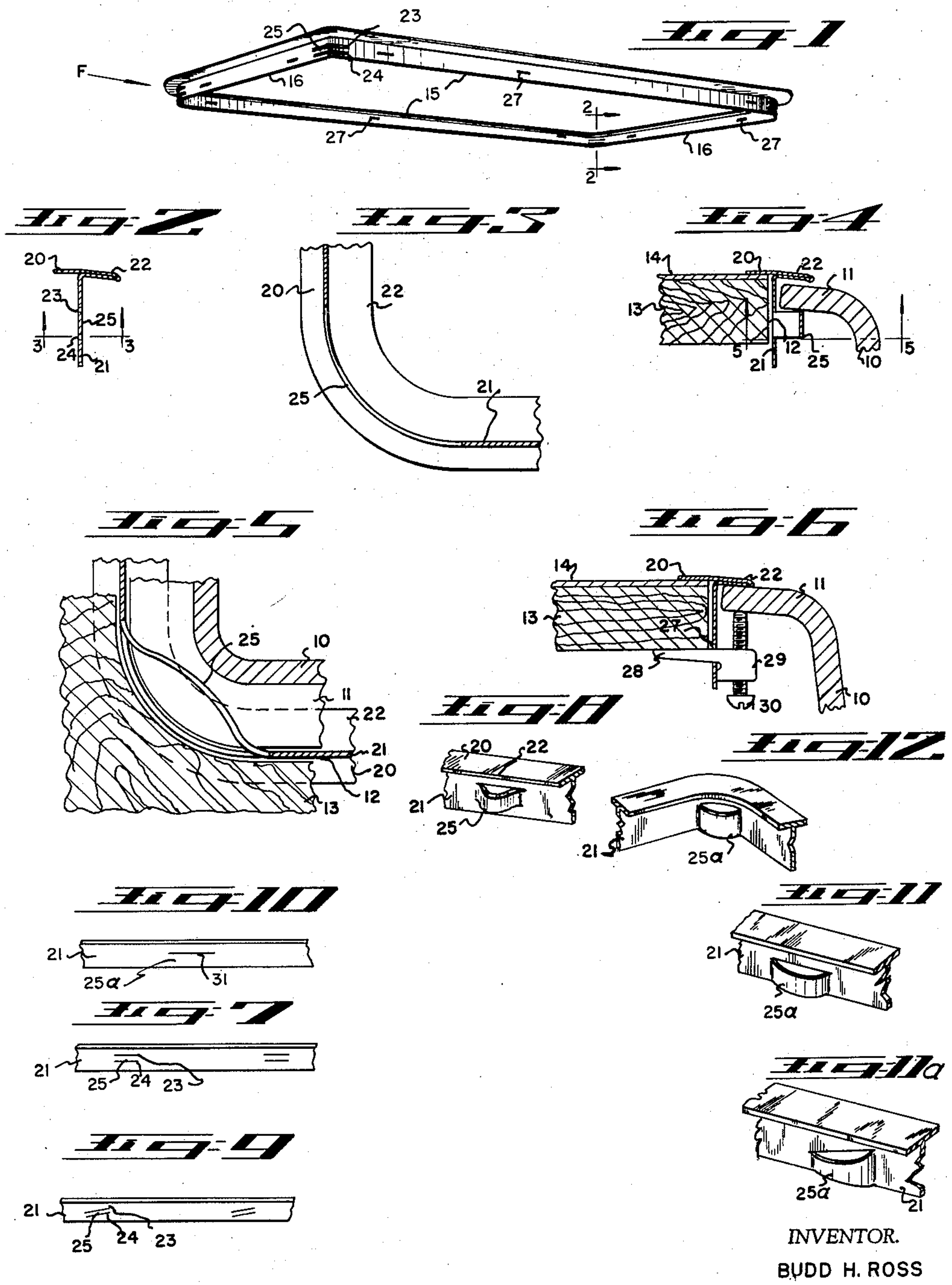
Figure 1 is a perspective view of the under side of an appliance frame embodying certain features of the invention to provide temporary corner supports in installing a flanged sink or the like in a drainboard opening.
Figure 2 is a cross sectional view of the frame, taken on the line 2—2 of Figure 1.
Figure 3 is a fragmentary longitudinal sectional view taken on the line 3—3 of Figure 2.
Figure 4 is a fragmentary sectional view, similar to Figure 2, showing a sink supported in a drainboard opening.
Figure 5 is a sectional view on the line 5—5 of Figure 4.
Figure 6 is a sectional view showing one type of fastening lug which may be used with the frame of Figure 1.
Figure 7 is a fragmentary elevational view of a frame similar to the frame in Figure 1, showing the temporary support feature in a straight side portion of the frame.
Figure 8 is a perspective view of the temporary support shown in Figure 7.
Figure 9 is a view similar to Figure 7, but showing a modified construction having a clamping function.
Figure 10 is a view similar to Figure 7, showing a further modification.
Figure 11 is a perspective view of the modification shown in Figure 10.
Figure 13:
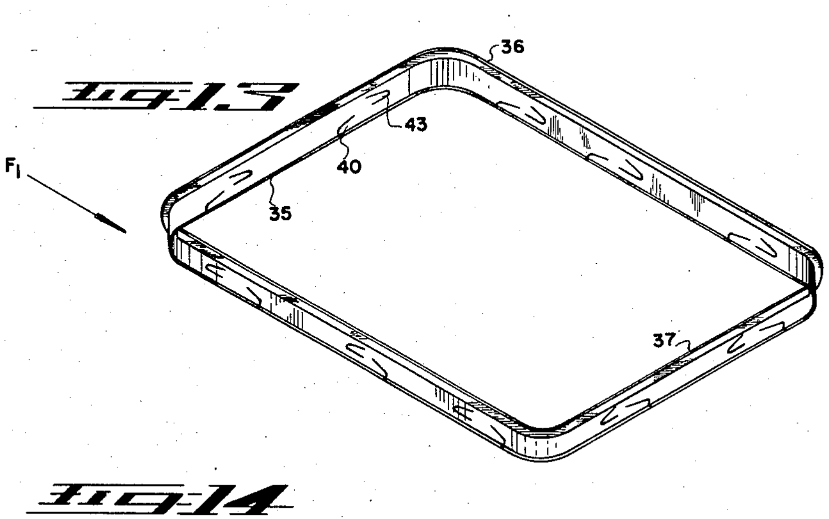
Figure 14:
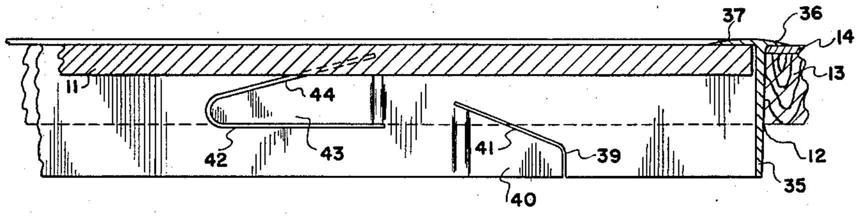
Figures 15, 16, 22, 25:
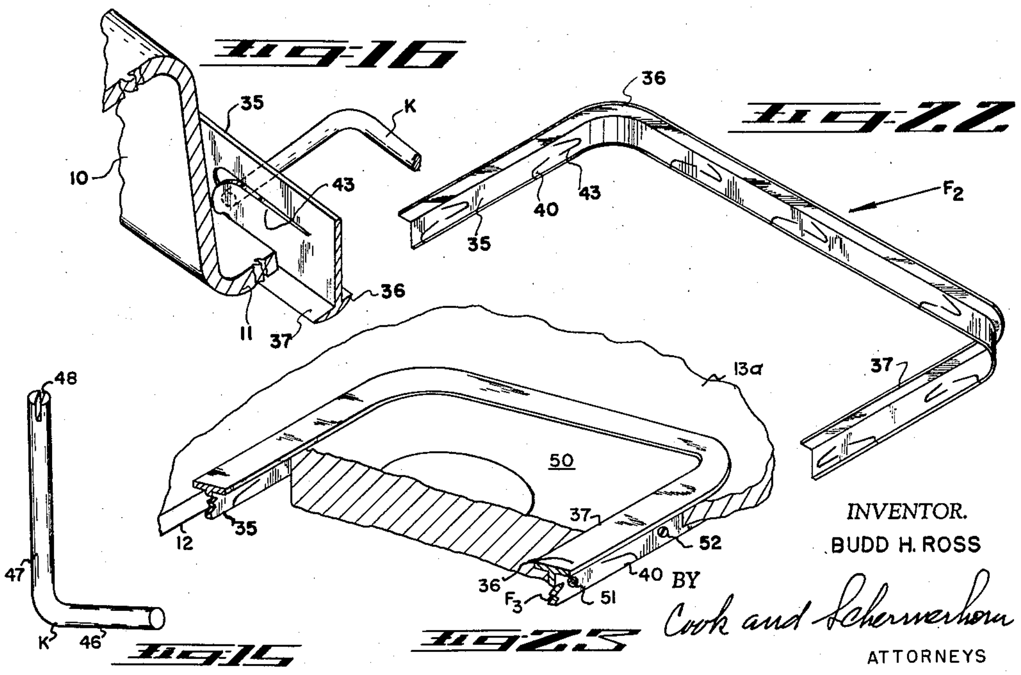
Figure 17:
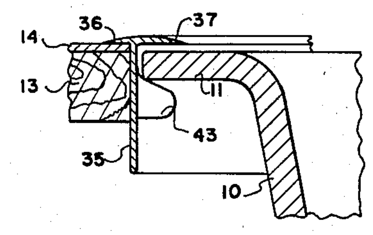
Figure 18:
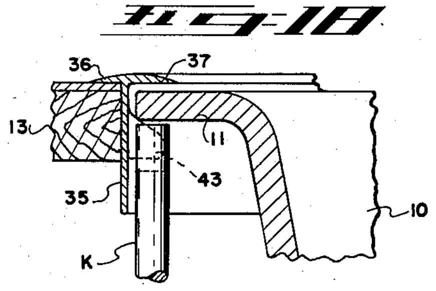
Figure 19:
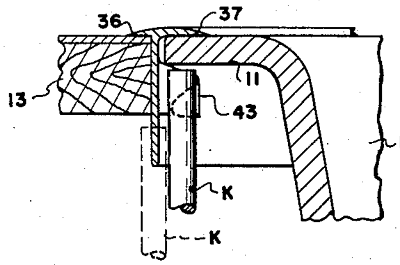
Figure 20:
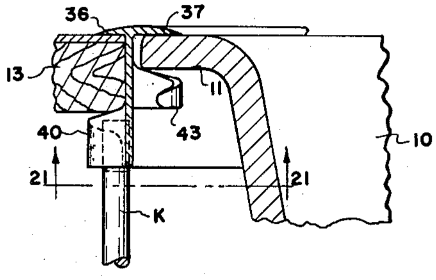
Figure 21:
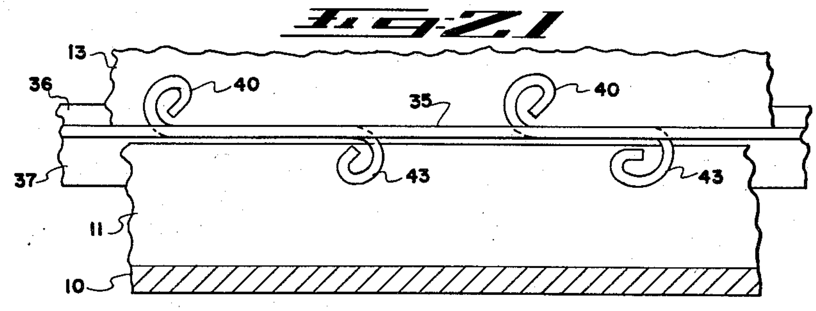
Figure 29:
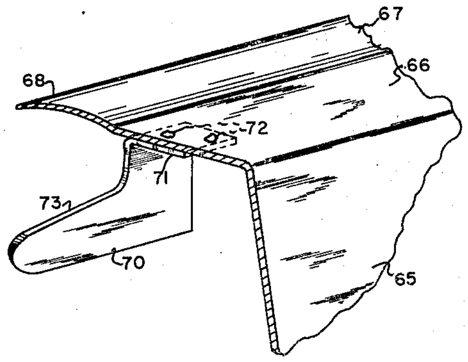
Figure 24:
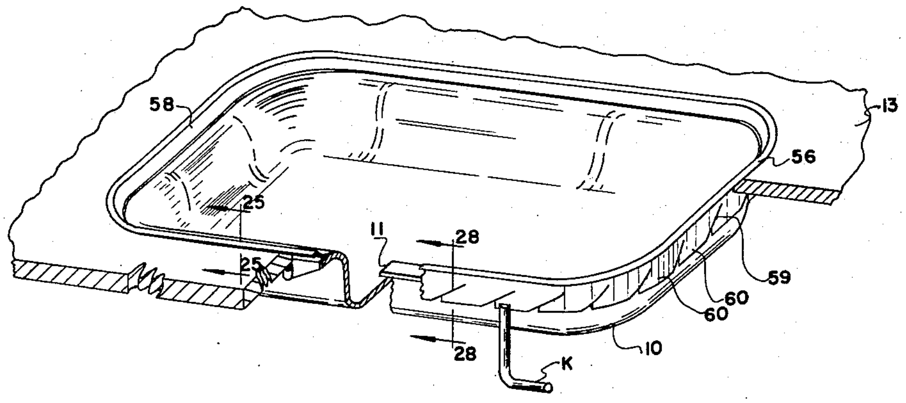
Figure 25:
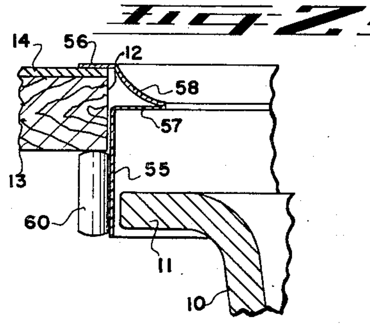
Figure 26:
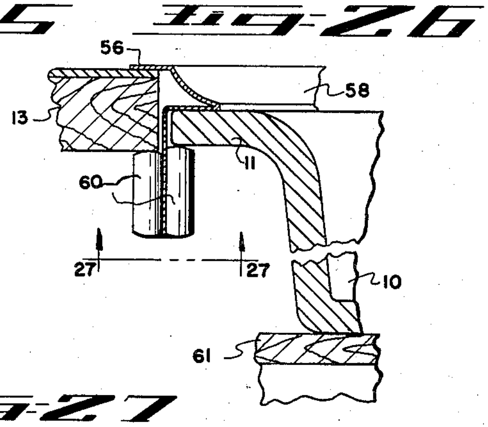
Figure 27:
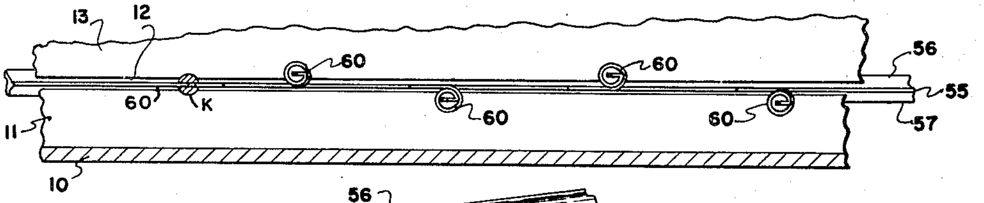
Figure 28:
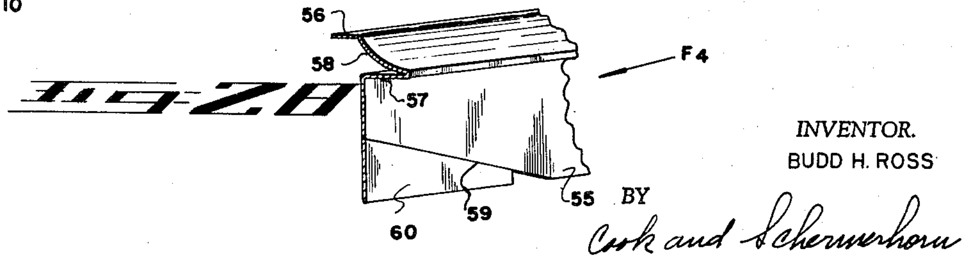
Figure 30:
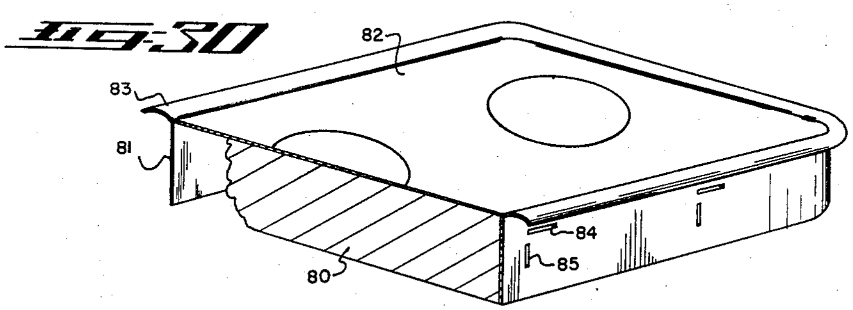
Figure 31:
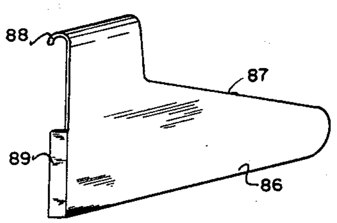
Figure 32:
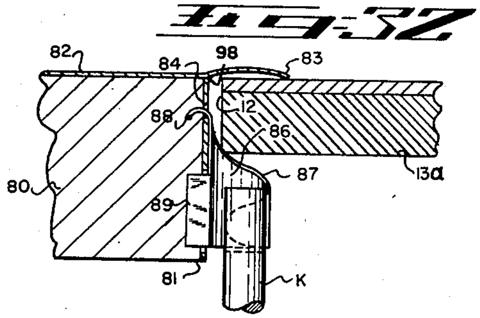
Figure 33:
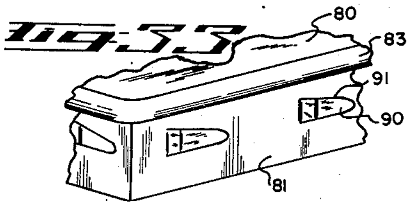
Figure 34:
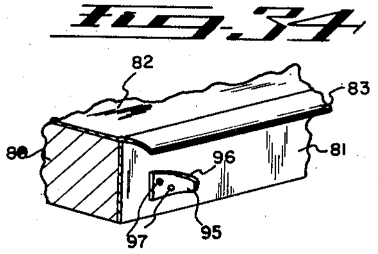

Figure 11*a* is a perspective view of a further modification having a clamping action;

Figure 12 is a perspective view showing the Figure 11 form of support applied to a curved or corner portion of the frame;

Figure 13 is a perspective view of the under side of an appliance frame having clamping tongues embodying the principles of the invention to clamp a flanged sink or the like in a drainboard opening without the use of conventional fastening devices;

Figure 14 is an enlarged fragmentary view, with certain parts in section, showing the relationship of the clamping tongues in Figure 13 to the sink rim and drainboard;

Figure 15 is a perspective view of a key for bending the tongues into clamping position;

Figure 16 is a fragmentary perspective view showing the first step in mounting the frame of Figure 13 on a sink, the frame and sink being in inverted position;

Figure 17 is a fragmentary sectional view showing the frame attached to the sink and the frame and sink set into an opening in a drainboard;

Figure 18 is a view similar to Figure 17 showing the step of tightening the sink clamp tongues with the tool of Figure 15;

Figure 19 shows the completion of the tightening operation started in Figure 18 and the beginning of the next operation of bending the drainboard clamping tongues;

Figure 20 illustrates completion of the installation of the sink in the drainboard opening;

Figure 21 is a bottom plan view, with parts in section, taken on the line 21—21 of Figure 20;

Figure 22, on sheet 2, is a perspective view of the under side of a three-sided appliance frame which is otherwise similar to the four-sided frame shown in Figure 13;

Figure 23, also on sheet 2, is a top perspective view, with parts in section, showing an adaptation of the sink frame of Figure 13 for mounting an electric burner plate or the like in a counter opening;

Figure 24 is a top perspective view, with parts broken away, showing a further modification of appliance frame used for mounting a sink or the like in a drainboard opening;

Figure 25 is a fragmentary sectional view on line 25—25 of Figure 24, showing how the sink can be installed and also how it can be removed or replaced without disturbing the frame in the drainboard opening;

Figure 26 is a view similar to Figure 25, showing the use of a temporary support while the sink is being secured in the frame;

Figure 27 is a fragmentary bottom plan view, taken on the line 27—27 of Figure 26, showing the sink completely installed in the drainboard opening;

Figure 28 is an enlarged fragmentary perspective view, taken approximately on the line 28—28 of Figure 24, showing the inside of the frame;

Figure 29, on sheet 3, is a fragmentary perspective view of a further application of the principles of the invention to form a self-rimming sink;

Figure 30 is a fragmentary top perspective view showing how certain principles of the invention may be applied to an electric burner plate or the like for mounting the same in a counter opening without a separate mounting frame;

Figure 31 is a perspective view of an attachable clamping tongue for use with the burner plate shown in Figure 30;

Figure 32 is a fragmentary sectional view illustrating the operation of clamping the burner plate of Figure 30 in a counter opening;

Figure 33 is a fragmentary top perspective view illustrating another application of the principles of the invention to an electric burner plate or the like for mounting the same in a counter opening; and Figure 34 is a view similar to Figure 33, showing a further modification.

*Embodiments in Figures 1 to 12*

Referring first to Figures 1 to 6, there is shown a sink 10 having an outwardly turned rim 11 which is to be mounted within an opening 12 formed in a drainboard 13. Such drainboards are normally covered by a sheet of suitable protective and decorative material 14. The invention may be applied to a sink, basin or other rimmed appliance of any shape, such as rectangular, oval or circular, but for the purpose of illustration a common form of rectangular sink will be used as an example.

The mounting or trim frame F, shown in Figure 1, is shaped to correspond to the peripheral outline of the sink rim 11. Frame F in this case is rectangular, having sides 15 and ends 16 connected by rounded corners. The frame may be made of an aluminum extrusion, if desired, or of other suitable material, although in this case it is made of a formed strip of flat sheet material such as stainless steel. One side edge portion 20 of the strip forms a horizontal drainboard flange, and the other side edge portion 21 forms a vertical web. An intermediate portion of the strip is doubled back upon itself to form a sink flange 22 which, in this case, is disposed in the plane of the flange 20 to form a T-head on the strip. Web portion 21 is adapted to be inserted in the drainboard opening 12.

A pair of parallel horizontal slots or break lines 23 and 24 is formed in web 21 in each corner of the frame to provide therebetween a deformable strip of metal 25, both ends of which are integral with web 21. The upper slot or break line 23 is spaced beneath the flange 22 a distance slightly greater than the thickness of the rim 11 of the sink which is to be installed. Thus, after placing the frame F on the sink rim, the strips 25 may be bent inwardly beneath the sink rim to connect the frame loosely to the sink. The sink and frame may then be lowered in the opening 12 until they are supported, as shown in Figure 4, with the flange 20 resting on top of the drainboard. The deformed strips 25 thereby form temporary corner supports for the sink to hold the sink approximately in its ultimate position while some other clamping and fastening means are applied.

One form of suitable clamp device is shown in Figure 6. For the use of this form of clamp, the sides and ends of the frame F are provided with horizontal slotted openings 27 through which may be inserted the tongue 28 of a clamp 29. Clamp 29 is bored and threaded to receive a screw 30 of sufficient length to engage the under side of sink rim 11. When screw 30 is tightened, sink rim 11 is clamped securely against the frame flange 22, and tongue 28 clamps the drainboard against the under side of drainboard flange 20.

Slots or break lines 23 and 24 may be formed in the straight sides 15 or ends 16 of the frame, if desired, instead of in the corners, as shown in Figure 7. Even in the straight sides of the frame, the strips 25 may be readily deformed out of the plane of web 21 to support a sink or other appliance rim on the edges of such strips. When the strips 25 are pushed in, the web material in these strips assumes a permanent stretch so that the strips do not spring back into the plane of the web. This is true of both aluminum and stainless steel which are the most commonly used materials for such appliance frames. Opening 12 in the drainboard is preferably cut to a size only slightly larger than the outline of the sink rim, whereby relatively little inward deformation of the strips 25 is required to support and lock the sink rim in the frame F.

If a clamping action is desired, the slots or break lines 23 and 24 may be cut on an angle relative to flange 22 as shown in Figure 9. Then, when the strips 25 are deformed inwardly of the frame, they will clamp the sink rim 11 firmly against the flange 22 of the frame.

The same result may be achieved by the use of a single slot or break line 31, as shown in Figure 10. Slot 31 extends parallel with the bottom edge of the web 21 to form the upper or supporting edge of a deformable strip **25*a*, which may be pressed or stretched inwardly of the frame as shown in Figure 11. When corner supports are desired, the single slot 31 may be formed in each corner of the frame, as shown in Figure 12. When clamping action is desired, the single slot 31 may be formed at an angle to the flange 22**, as shown in Figure 11*a*.

*Embodiments in Figures 13 to 23*

In the embodiment shown in Figures 13 to 21, the appliance frame $F^1$ is shown by way of an example as an aluminum extrusion, although it, like the frame F of Figure 1, may also be made of stainless steel strip or other suitable material. The extrusion in this example is T-shaped in cross section having a vertical web 35 with an outwardly directed drainboard flange 36 and an inwardly directed sink flange 37. Slots or break lines 39 are cut upwardly from the lower edge of the web to form a lineal series of bendable drainboard clamping tongues 40 having sloping upper edges 41. Another series of slots or break lines 42 are cut higher in the web to form a lineal series of bendable sink clamping tongues 43 having sloping upper edges 44. The edges 41 are positioned to intersect the bottom line of the drainboard, and the edges 44 are positioned to intersect the bottom line of the said rim, as shown in Figure 14.

Tongues 40 and 43 may be deformed by any suitable means, but there is illustrated in Figure 15 a key or wrench K for curling and winding the tongues to produce a powerful wedging and clamping action on the sloping cam edges 41 and 44. The key K has a handle end 46 at right angles to a shank 47 having a slotted end 48.

To mount the frame $F^1$ on a sink, the sink is first inverted inside the frame, as shown in Figure 16, and the ends of tongues 43 are pushed inwardly to overlie the sink rim 11. This operation will unite the sink with the frame so that the sink and frame together may then be turned over and inserted through the top of the drainboard opening, as shown in Figure 17. The sink is thereby supported in the frame $F^1$ by means of tongues 43, and the frame is in turn supported on the drainboard by flange 36. Key K is then applied to the ends of tongues 43 and twisted as shown in Figure 18, causing the sloping upper edges 44 of the tongues to cam the sink rim up securely against the under side of frame flange 36, as shown in Figure 19. The tongues, thus tightened, exert a powerful clamping force which does not tend to work loose after installation. If desired, this tightening operation may be performed while the sink is inverted in its Figure 16 position before being placed in the drainboard opening.

The next step is to apply the key K to the drainboard clamping tongues 40, as shown in broken lines in Figure 19. Twisting the tongues 40 applies a similar powerful clamping action against the under side of the drainboard, the reaction of which draws the frame flange 36 tightly down against the top surface of the drainboard, as shown in Figure 20. This completes the installation which will then appear from its under side as shown in Figure 21. As many of the tongues may be tightened as necessary to hold the flanges 36 and 37 of the frame in snug continuous engagement with the drainboard and sink rim. A suitable mastic or filler may be applied under one or both of these flanges, if desired, to make the joints watertight.

The frames F and $F^1$, just described, extend entirely around the periphery of the sink rim. It is sometimes desired to mount a sink which is constructed on its rear side to abut a vertical wall along the back side of the drainboard. In such case, a four-sided or complete peripheral frame cannot be used. Figure 22 illustrates a three-sided frame $F^2$ which is in all respects similar to the frame $F^1$ in Figure 13, except that the back side is omitted. All the features and advantages of the frame $F^1$ are present in the frame $F^2$, and identical reference numerals have been used to designate corresponding parts.

Figure 23 shows a form of frame $F^3$ for mounting a rimless electric burner plate 50, and the like, in an opening in a counter **13*a*. Frame $F^3$ is in all respects identical with frame $F^1$ in Figure 13, except for the elimination of upper tongues 43 and the provision of screw holes 51. Frame $F^3$ is first mounted oon the burner plate by means of screws 52 in the holes 51, so that the inner flange 37 overlies the top of the burner plate. The frame and burner plate together are then inserted in the counter opening and supported by outer flange 36 resting on top of the counter. Tongues 40 are then turned outwardly to engage the under side of the counter, and, preferably, the key K is applied to tighten the tongues 40** in the same manner as described in connection with Figure 20.

The frame $F^3$ is particularly adapted for use with any appliance having flat vertical side walls without a rim of the nature of sink rim 11. The mounting frame thereby converts a rimless appliance into a rimmed appliance whereby, after attachment of the frame $F^3$, the burner plate 50 may be considered as a rimmed appliance.

If desired, the frame $F^1$ itself may be used for mounting the burner plate 50 by merely making the necessary screw holes 51. In such case, the tongues 43 are not used, but they do not hinder the use of the frame in this manner.

*Embodiments in Figures 24 to 28*

Figures 24 to 28 illustrate a drop edge type of frame for mounting a sink or other appliance in depressed position in a drainboard or counter opening below the top surface thereof.

In the illustrated embodiment, the frame $F^4$ is formed from a strip of material of uniform thickness, such as stainless steel sheet. Referring first to Figure 28, one edge portion of the strip forms a vertical web 55 and the opposite edge portion forms an outturned horizontal drainboard flange 56. Intermediate these two portions the strip has a right angle bend forming an inturned horizontal sink flange 57. At the inner edge of flange 57, the material is bent back upon itself and upwardly curved to form a drop edge portion 58 interconnecting the two flanges 57 and 56, whereby the flange 57 is disposed on a lower level than the flange 56.

Vertical web 55 has a series of parallel inclined break lines 59 therein extending upwardly from the lower edge of the web to form a lineal series of identical tongues 60 having sloping upper edges. Some of these tongues may be turned inwardly to form sink clamping tongues and others may be turned outwardly to form drainboard clamping tongues, as desired. A single set of tongues thus serves a dual purpose, since the drop edge 58 lowers the under side of the sink rim to the approximate level of the under side of the drainboard, as shown in Figure 6, whereby the sloping upper edges of the tongues intersect the line of the bottom surface of the sink rim as well as the line of the bottom surface of the drainboard and different sets of tongues are not necessary for clamping the sink and drainboard. Usually, the sink rim is of less thickness than the drainboard, and the drop edge 58 is preferably designed to fill in the space between the top of the sink rim and the top of the drainboard when their bottom sides are approximately on the same level.

Because of the large number of clamping tongues thus provided and their close spacing along the frame, it is possible to make the frame flange 56 conform to irregularities in the drainboard surface, drop edge 58 providing an element of flexibility between the two flanges 56 and 57. In order to make a watertight seal, a suitable mastic or filler may be applied under one or both flanges of the frame, if desired.

Figures 25 and 26 illustrate one installation procedure. In Figure 25, the frame $F^4$ has been secured in the drainboard opening 12 and clamped in place by turning a number of the tongues 60 outwardly. The sink is then raised into the opening from beneath and placed on a temporary support 61, while other of the tongue 60 are turned inwardly to clamp the sink rim against flange 57 of the frame. The key K of Figure 15 is preferably employed to wind and tighten the clamping tongues as shown in Figure 27.

Alternatively, the frame $F^4$ may first be attached to the sink by certain of the tongues, as illustrated in Figure 16 in connection with the frame $F^1$. Then, the frame $F^4$ and sink together may be lowered into the drainboard opening, and other of the tongues 60 turned outwardly to clamp the drainboard.

Figure 25 further illustrates how the sink can be removed or replaced without disturbing the frame $F^4$ after the latter has been installed. To accomplish this, the inwardly turned tongues 60 are merely straightened out with the key K, so that the sink will drop down away from the frame. This removability feature, as well as the optional installation procedure feature just described, are inherent in both frames $F^1$ and $F^4$.

*Embodiments in Figures 29 to 34*

Figure 29 illustrates a special form of mounting adaptable to sink or basin bowls and other appliances having a relatively thin formable rim. The numeral 65 designates, for example, a stainless steel sink having a horizontal rim 66. Rim 66 terminates in a slightly arched resilient lip portion 67 having a relatively thin peripheral edge 68 which is slightly downturned. In this case, the lip portion 67 and edge 68 perform the same function as frame flange 56 in Figure 28 or frame flange 20 in Figures 1 to 6, in that lip 67 is sufficiently flexible to conform to irregularities in the drainboard or counter surface whereby it may be clamped down to make a neat fit with such surface. To provide a watertight seal, a mastic or filler may be applied under the slight arch of lip 67.

Thus, the sink 65 is supported in the previously mentioned drainboard opening 12 by means of lip 67 which overlies the drainboard. The lip is clamped down by a lineal series of clamping tongues 70 disposed in vertical planes within the drainboard opening and extending in a circumferential direction beneath rim 66. Tongues 70 are equipped with horizontal tabs or lugs 71 which are spot welded at 72 to the under side of rim 66.

Tongues 70 have sloping upper edges 73 which may be turned outwardly under the drainboard in the same manner as shown in Figures 20 and 25. Since no separate mounting frame is required, this arrangement may be referred to as a self-rimming sink, but it is apparent that this form of construction is also applicable to other appliances mounted in a counter opening.

The electric burner plate 80 in Figure 30 is equipped with a peripheral frame 81 in the form of a vertical sheet metal side wall. The top of the burner plate is covered with a metal plate 82 having a slightly arched and somewhat resilient rim flange 83 similar to lip 67 in Figure 29. Side wall 81 fits within a prepared counter opening, and rim flange 83 overlies the top of the counter to support the burner unit in the opening. Side wall 81 is provided at intervals with horizontal slots 84 and vertical slots 85, arranged in a generally inverted L configuration, as shown.

Attachable tongues 86, as shown in Figure 31, are provided to clamp the burner plate securely in the counter opening. Tongues 86 have sloping upper edges 87 which apply a cam or wedging action against the under side of the counter when the tongues are bent outwardly in engagement therewith. Tongues 86 have horizontal suspenson hooks 88 to fit in slots 84 and vertical abutment flanges 89 to be inserted in slots 85. By applying the key K, the tongues may be curled against the under side of the counter, as shown in Figure 32, to draw rim flange 83 down snugly against the top of the counter.

In Figure 33, the vertical sheet metal side wall or frame 81 is equipped with integral bendable tongues 90 having sloping upper edges 91. When these tongues are formed in the sheet 81, they are preferably displaced slightly outwardly from the plane of sheet 81 so that, after the burner is placed in the opening 12, the tongues may be readily engaged by a screwdriver, or the like, and pried out to a convenient position for receiving the key K. The tongues may then be curled the same as the tongues 86 in Figure 32.

In Figure 34, the vertical frame wall 81 is equipped with attached tongues 95 having sloping upper edges 96. These togunes are integrally united with the web sheet 81 by spot welds 97. The tongues lie flat against web 81, and, after the burner plate is inserted in the counter opening 12, the free ends of the tongues may be pried out with a screwdriver and then curled with the key K as in Figure 32.

Tongues 86, 90 and 95 all lie substantially in the plane of web 81 before they are bent out to clamp the under side of counter 13*a*. Web 81 may be integrally connected with rim 83 in each example as by welding as indicated at 98 in Figure 32.

Having now described my invention and in what manner the same may be used, what I claim as new and desire to protect by Letters Patent is:

1. A rectangular frame adapted to occupy the outer portion of a sink opening in a drainboard, said frame having a flanged head on its upper side, with an outer flange adapted to rest upon the drainboard top and an inner flange adapted to rest upon the flange of the sink, the corners of said frame having pairs of slots formed therethrough, the metal between said slots being bendable to curve inwardly to form a support to the under side of the sink flange.

2. A rectangular metal frame adapted to occupy the outer portion of a sink opening in a drainboard, said frame comprising an elongated metal band having a flanged head on its upper side, with an outer flange adapted to rest upon the drainboard top and an inner flange adapted to rest upon the flange of the sink, said band having a depending web with pairs of laterally spaced longitudinal slots formed therethrough, the metal between said slots of each pair forming a strip which is bendable to curve inwardly of the frame and provide a support on the upper curved edge of said strip intermediate its ends for the under side of the sink flange.

3. A frame member for supporting a peripherally flanged sink within a correspondingly shaped opening in a drainboard, said frame member being of generally rectangular shape and a continuous metal band adapted to surround the sink flange, said band having a depending web inserted between the sink flange and the edge of the drainboard defining the sink receiving opening, said band also having laterally extending top flanges overlapping the top surfaces of the sink flange and the drainboard, said depending web having pairs of slots formed therethrough extending longitudinally of the band, the metal between said slots of each pair being deformable to curve inwardly of the frame with the curved upper edge of the deformed metal forming a support for the under side of the sink flange.

4. A frame member for supporting a peripherally flanged sink within a correspondingly shaped opening in a drainboard, said frame member being of generally rectangular shape and a continuous metal band adapted to surround the sink flange, said band having a depending web inserted between the sink flange and the edge of the drainboard defining the sink receiving opening, said band also having laterally extending top flanges overlapping the top surfaces of the sink flange and the drainboard, said depending web having a series of lineally spaced integral strips of metal extending longitudinally of the band, intermediate portions of said strips being deformable inwardly of the frame to support the under side of the sink flange on the upper edges of the strips, and each of said strips being integrally connected at both ends with said band after being deformed in the manner described.

5. A rectangular frame adapted to occupy the outer portion of a sink opening in a drainboard, said frame comprising an elongated metal band having a flanged head on its upper side with an outer flange adapted to rest on the drainboard top and an inner flange adapted to rest on the flange of the sink, said band having a depending web adapted to be inserted between the sink and drainboard, integral deformable strips of metal in said web extending longitudinally of the band, said strips having sink supporting edge portions intermediate the ends of the strips, said strips being adapted to be curved inwardly of the frame to engage the under side of a sink flange on said edge portions, and means on said frame for engaging the under side of the drainboard to hold said frame securely in said opening.

6. A frame member for supporting a peripherally flanged sink within a correspondingly shaped opening in a drainboard, said frame member being of generally rectangular shape and a continuous metal band adapted to surround the sink flange, said band having a depending web inserted between the sink flange and the edge of the drainboard defining the sink receiving opening, said band also having laterally extending top flanges overlapping the top surfaces of the sink flange and the drainboard, said depending web having a series of lineally spaced integral deformable strips of metal extending longitudinally of the band, said strips curving inwardly of the frame and having sink supporting edge portions intermediate the ends of the strips after being deformed to support a sink flange.

7. A frame member for supporting a peripherally flanged sink within a correspondingly shaped opening in a drainboard, said frame member being of generally rectangular shape and a continuous strip adapted to surround the sink flange, said strip having a depending web inserted between the sink flange and the edge of the drainboard defining the sink receiving opening, said strip also having laterally extending top flanges overlapping the top surfaces of the sink flange and the drainboard, said depending web having a series of lineally spaced integral laterally bendable clamping tongues formed therein by slots extending transversely through the web, said tongues being arranged to extend lengthwise of the strip while in the plane of the web and having downwardly inclined surfaces along the upper side edges thereof.

8. A counter having a sink receiving opening through the top thereof, a sink having an outwardly projecting flange extending around the side wall at the upper edge thereof, said sink being positioned within said opening with the top surface of the flange substantially in the plane of the top surface of the counter, and a frame member supporting the sink in the opening, said frame member being a continuous strip surrounding the flange on the sink and having a depending web thereof inserted between the sink flange and the edge of the counter defining the sink receiving opening, said strip also having laterally extending top flanges overlapping the sink flange and the counter top adjacent the opening, said depending web having a series of lineally spaced integral laterally bendable clamping tongues formed therein by slots extending transversely through said web, said tongues being arranged to extend lengthwise of the strip while in the plane of the web and having downwardly inclined surfaces along the upper side edges thereof, said tongues being bent laterally out of the plane of the web to cause some of the upper edges thereof to bear against the under surface of the sink flange and wedge the flange upwardly against the top flange of the frame, and to cause some of the upper edges of the tongues to bear against the under surface of the counter to draw the top flange of the frame member against the upper surface of the counter.

9. In a peripherally flanged sink and drainboard assembly in which the sink flange is surrounded by a drainboard of greater thickness, a sealing ring of bendable flexible metal having a head portion in engagement with the top of the sink flange and drainboard and an integral web portion extending downwardly between the sink and drainboard, said web having a plurality of longitudinally spaced integral generally triangular clamping tongues formed by a series of slots cut upwardly through the web at an acute angle with the lower edge of said web, the upper edges of said clamping tongues forming wedge surfaces and said clamping tongues being individually bendable in opposite directions laterally of said web to bring said wedge surfaces into engagement with the under side of said sink flange and said drainboard and wedge said sink flange and said drainboard upwardly into clamped relation between said tongues and the head portion of said sealing ring during lateral bending of said tongues.

10. A counter having an appliance receiving opening through the top thereof, an appliance positioned in said opening with the top surface of the appliance substantially in the plane of the top surface of the counter, and a frame member supporting the appliance in the opening, said frame member being a continuous strip surrounding the appliance, having a depending web inserted between the appliance and the edge of the counter defining the appliance receiving opening and having laterally extending top flanges overlapping the appliance and the counter top adjacent the opening, said depending web having a series of lineally spaced integral laterally bendable clamping tongues formed therein, said tongues being arranged to extend lengthwise of the strip while in the plane of the web and having downwardly inclined surfaces along the upper side edges thereof, said tongues being bent laterally out of the plane of the web to cause the upper edges thereof to bear against the under surface of the counter to draw the top flange of the frame member against the upper surface of the counter.

11. A trim frame for mounting a peripherally flanged appliance in depressed position in an opening in a counter comprising an appliance encircling band of material of uniform thickness, said band having a lower edge portion forming a vertical web insertable between the appliance flange and the edge of said opening, said band having a right angle bend in cross section at the top of said web forming an inturned horizontal flange adapted to overlie the appliance flange, said band having a reverse bend at the inner edge of said flange curving outwardly and upwardly in cross section back to the vertical plane of said web forming a drop edge, said band having an outturned upper edge portion forming a horizontal top flange on said drop edge above said inturned flange adapted to overlie the counter top, and a series of parallel diagonal break lines extending from the lower edge of said web part way up to said inturned flange defining deformable wedge-shaped lugs adapted to be curled inwardly and outwardly of the frame against the undersides of the appliance flange and counter.

12. In a counter having an opening containing a peripherally flanged appliance, an appliance encircling frame strip having a cross section composed of a vertical web projecting below the undersides of the counter and appliance flange, an inturned flange on said web overlying the appliance flange, an outturned flange on said strip above said inturned flange overlying the counter top, and a curved drop edge interconnecting said inturned and outturned flanges, said web having a series of integral, laterally bent clamping tongues, each tongue having a downwardly inclined upper side edge, some of said tongues being inwardly bent to wedge said inclined edges against the under side of the appliance flange, and some of said tongues being outwardly bent to wedge said inclined edges against the under side of the counter.

13. Means for mounting a peripherally rimmed appliance in depressed position in an opening provided therefor in a horizontal support, comprising a frame having an outwardly projecting flange to overlie the top of the support about the edge of said opening and an inwardly projecting flange to overlie the rim of the appliance, a resilient drop edge interconnecting said two flanges, and a downwardly extending web for insertion between the edge of said opening and the rim of the appliance, said web being provided at intervals longitudinally thereof with longitudinally extending flexible tongues disposed substantially in the plane of the web, said tongues being bendable laterally in opposite directions selectively to underlie the appliance rim for locking the appliance against downward movement relative to said frame and to underlie the support for locking the frame against upward movement relative to the support, said tongues having longitudinally sloping edge surfaces confronting said flanges to clamp said rim and said support thereagainst.

14. Means for mounting a horizontally disposed appliance in an opening provided for the same in a horizontally disposed support, comprising a frame which is characterized by an outwardly projecting flange for engagement with the top of the support about the edge of the opening in the latter, an inwardly projecting flange for engagement with the top edge of the appliance, and a downwardly extending web for insertion between the edge of the opening and the edge of the appliance, which web is provided at intervals longitudinally thereof with tongues extending longitudinally of the web, which tongues are disposed substantially in the plane of the web but are deformable laterally, said tongues having longitudinally sloping edge surfaces confronting said flanges.

15. A mounting frame as defined in claim 14 wherein said tongues are integral with said web.

16. A mounting frame as defined in claim 14 wherein said tongues are spaced from the lower edge of said web.

17. A mounting frame as defined in claim 14 wherein said tongues are joined at both ends thereof to said web.

18. A mounting frame as defined in claim 14 further comprising a plurality of fastening devices spaced longitudinally along said web for securing said appliance to said frame, said tongues being deformable laterally into positions beneath the bottom of the support to lock the frame against upward movement relative to the support.

19. Means for mounting a peripherally rimmed appliance in an opening provided therefor in a support, comprising a series of flexible tongues around the appliance connected with the appliance beneath said rim and disposed in planes perpendicular to said rim inwardly from the outer edge of said rim, said tongues extending parallel with said edge for insertion in said opening with said rim overlying said support about the edge of said opening, said tongues being bendable laterally to underlie said support, and said tongues having longitudinally sloping edge surfaces confronting said rim to clamp said support thereagainst.

20. Means for mounting a peripherally rimmed appliance in an opening provided therefor in a support, comprising a series of flexible tongues around the appliance having longitudinally sloping side edges confronting the under side of said rim, said tongues extending longitudinally of said rim and perpendicular thereto inwardly from the outer edge thereof for insertion in said opening with said rim overlying said support about the edge of said opening, and means establishing operative connection between said tongues and said rim to form a series of support clamps around the periphery of the appliance when said tongues are bent outwardly under said support.

21. Means for supporting an appliance having a curved peripheral rim in an opening provided therefor in a support, comprising a frame having an outwardly projecting flange to overlie the top of the support about the edge of said opening, an inwardly projecting flange to overlie said appliance rim, and a vertical web for insertion in said opening between the edge of the opening and said rim, said frame having curved portions conforming to the curvature of the appliance rim and said web in said curved portions of the frame being provided with longitudinally extending break lines defining longitudinal deformable strips of web material, said strips being bendable inwardly of the frame and having appliance supporting edge portions to engage the under side of the curved portions of the appliance rim.

22. In combination, an appliance having a curved peripheral rim and a frame for mounting said appliance with its rim horizontally disposed in an opening provided therefor in a horizontal support, said frame having an inwardly projecting flange overlying the appliance rim, an outwardly projecting flange adapted to overlie the top of the support about the edge of the opening therein, and a downwardly extending web about the appliance rim for insertion in said opening, said frame having curved portions conforming to the curvature of the appliance rim and said web in said curved portions of the frame having longitudinal slits defining integral longitudinal bendable strips of said web material, said strips being bent inwardly of the frame into positions beneath the rim of the appliance to lock the appliance against downward movement relative to the frame.

References Cited in the file of this patent

UNITED STATES PATENTS

| | | |
|---|---|---|
| 1,187,853 | Look | June 20, 1916 |
| 1,612,993 | Strand | Jan. 4, 1927 |
| 1,820,123 | Donovan | Aug. 25, 1931 |
| 1,928,393 | Pearce | Sept. 26, 1933 |
| 2,016,735 | Abramson et al. | Oct. 8, 1935 |
| 2,031,604 | Ingels | Feb. 25, 1936 |
| 2,084,024 | Getz | June 15, 1937 |
| 2,475,112 | Stanitz | July 5, 1949 |
| 2,485,090 | Finch | Oct. 18, 1949 |
| 2,502,553 | Ball | Apr. 4, 1950 |
| 2,503,910 | Kerby | Apr. 11, 1950 |
| 2,760,262 | Homan | Aug. 28, 1956 |
| 2,764,809 | Fenton et al. | Oct. 2, 1956 |

FOREIGN PATENTS

| | | |
|---|---|---|
| 109,198 | Sweden | Nov. 30, 1943 |